April 14, 1925.
G. A. CHAPMAN
MAP HOLDER
Filed Jan. 8, 1923
1,533,694
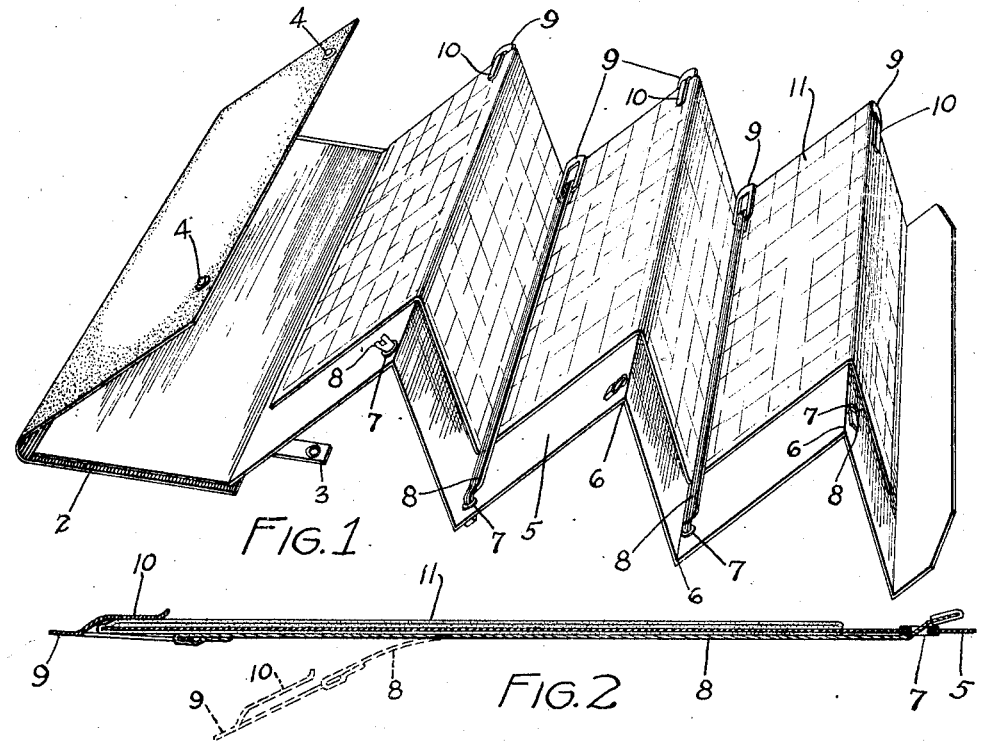
FIG. 1
FIG. 2
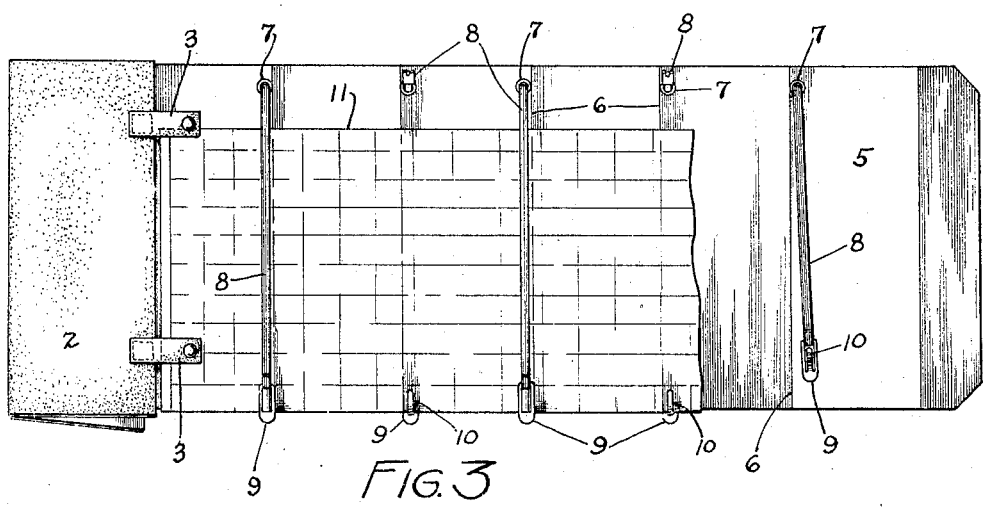
FIG. 3
Inventor
GEORGE A. CHAPMAN
By Paul, Paul & Moore
ATTORNEYS Patented Apr. 14, 1925.

1,533,694

UNITED STATES PATENT OFFICE.

GEORGE A. CHAPMAN, OF MINNEAPOLIS, MINNESOTA.

MAP HOLDER.

Application filed January 8, 1923. Serial No. 611,441.

*To all whom it may concern:*

Be it known that I, GEORGE A. CHAPMAN, a citizen of the United States, resident of Minneapolis, county of Hennepin, and State of Minnesota, have invented certain new and useful Improvements in Map Holders, of which the following is a specification.

The object of my invention is to provide a portable map holder adapted to be folded into compact form and carried in the pocket and adapted particularly for the use of automobile tourists who frequently wish to consult a map while driving in windy or inclement weather when it would be impracticable to unfold an ordinary map printed on thin paper and consult it without at least stopping the car or unfolding the map in such a position that it would not be affected by currents of air.

A further object is to provide a pocket device of the class described which will enable the tourist to quickly examine the map and determine his position or the route to be followed; and further, a device which will protect the map itself from being torn or defaced by the wind or weather.

Other objects of the invention will appear from the following detailed description.

The invention consists generally in various constructions and combinations all as hereinafter described and particularly pointed out in the claims.

In the accompanying drawings forming part of this specification,

Figure 1 is a perspective view of a map holder embodying my invention;

Figure 2 is a transverse sectional view showing the manner of placing the map on the holder;

Figure 3 is a plan view showing the reverse side of the holder and the manner of securing the map thereon.

In the drawing, 2 represents a cover or folder made of leather or any suitable material that will protect the folded map from dust and dirt when the device is not in use. This folder may be carried in the coat pocket or, if preferred, in the pocket provided for such articles, in the car, suitable fastening straps 3 being attached to one side of the cover to engage buttons or snaps 4 on the opposite section.

Between the sections of the cover, I provide a flexible sheet 5 attached at one end to the cover and having a series of parallel folds 6 therein dividing the sheet into a series of sections each of which is approximately the width of one section of the cover. This sheet is composed preferably of heavy paper though any other suitable material may be used. Near each fold is an eyelet 7 in which one end of a strap 8, preferably elastic, is mounted, the opposite end of the strap having a clip 9 thereon provided with a tongue 10 between which and the main portion of the clip, one edge of the sheet is inserted. These straps are preferably arranged alternately on the sheet, one on one side thereof, and the other on the opposite side and extend across it; and between the straps and the sheet, I provide a map 11 that is to be consulted, a longitudinal fold being formed therein so that one side of the map is on one side of the sheet and the opposite side thereof upon the opposite side of the sheet with the straps extending across the map. The map will therefore be held securely in place, and when the sheet is folded, the map will be folded along corresponding lines and with the sheet will fit snugly between the sections of the cover. The user of the map withdrawing it from the pocket can open it at any position, examine either side of the map, and determine his location or his route to travel, regardless of weather conditions and even without the necessity usually of stopping his car, and always without any danger of having the map torn or damaged by the wind. As soon as the desired information has been obtained, the sheet is easily and quickly folded into compact form, slipped between the sections of the cover and the device may be placed in the coat pocket or the pocket of the car where it can be reached conveniently for future reference. The clips at the ends of the straps have a projecting portion which can be easily grasped by the fingers for the purpose of releasing the map and changing its position in the holder or when it is desired to substitute another map for the one in use.

Instead of providing the cover sections, I may make the flexible sheet of sufficient length so that several of the folds will extend beyond the map and will serve as a means for concealing and protecting the map when the device is closed.

I claim as my invention:

1. A map holder comprising a sheet folded along parallel lines to form a series of sections, a map folded to receive one edge of said sheet and also folded to correspond to the folds of the sheet sections, and means for holding the map in place on said sections.

2. A map holder comprising a sheet folded along parallel lines to form a series of sections, a map folded to receive one edge of said sheet and also folded to correspond to the folds of the sheet sections, and means for holding the map in place on said sections, said means comprising a series of elastic bands extending across the sheet and having means for engaging the edges of the sheet for holding the map in place.

3. A device of the class described comprising a cover section, a sheet of flexible material mounted at one end within said cover sections, and having a series of transverse folds formed therein, the sections or panels formed by said folds being substantially the width of the cover sections and fitting between them when folded, a map folded along its middle portion to straddle said sheet, and having folds corresponding to those in said sheet, and means for removably fastening said map to said sheet.

4. A map holder comprising a sheet of comparatively stiff material folded along parallel lines to form a series of sections adapted to fold one upon the other, a map folded to correspond to the folds of the sheet sections and means for removably mounting the map on said sheet to allow different areas of the map to be examined when the sections of said sheet are unfolded or separated.

In witness whereof I have hereunto set my hand this 4th day of January 1923.

GEORGE A. CHAPMAN.